Figure 1:
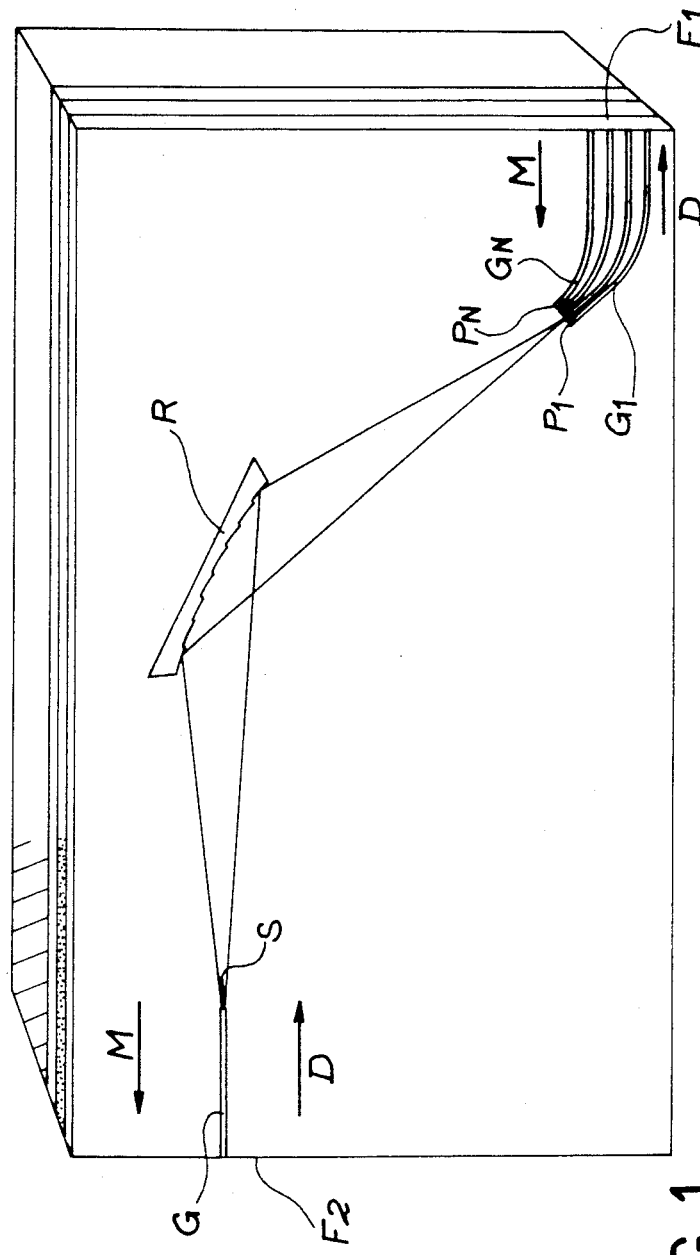

United States Patent [19]

Gidon et al.

[11] Patent Number: 4,786,133

[45] Date of Patent: Nov. 22, 1988

[54] MULTIPLEXER-DEMULTIPLEXER USING AN ELLIPTICAL CONCAVE GRATING AND PRODUCED IN INTEGRATED OPTICS

[75] Inventors: Pierre Gidon, Echirolles; Jean-Pierre Jadot, Meylan; Serge Valette, Grenoble, all of France

[73] Assignee: Commissariat a l'Energie Atomique, Paris, France

[21] Appl. No.: 135,134

[22] Filed: Dec. 18, 1987

[30] Foreign Application Priority Data

Dec. 31, 1986 [FR] France ................... 8618434

[51] Int. Cl.[4] ............................................. G02B 6/34
[52] U.S. Cl. ............................ 350/96.19; 350/96.12; 350/96.18
[58] Field of Search ............... 350/96.19, 96.11, 96.12, 350/96.13, 96.18; 370/1, 3

[56] References Cited

U.S. PATENT DOCUMENTS

| | | | |
|---|---|---|---|
| 4,523,803 | 6/1985 | Arao et al. | 350/96.13 |
| 4,740,951 | 4/1988 | Lizet et al. | 370/3 |
| 4,741,588 | 5/1988 | Nicia et al. | 350/96.19 |

FOREIGN PATENT DOCUMENTS 0149270  7/1985  European Pat. Off. .

Primary Examiner—William L. Sikes
Assistant Examiner—Robert E. Wise
Attorney, Agent, or Firm—Pearne, Gordon, McCoy & Granger

[57] ABSTRACT

The device comprises microguides (G1, G2, ... GN) traversed by light beams with N different wavelengths, a diffraction grating (R) formed by reflecting elliptical facets and a single microguide (G). Point (S) of the end of the single microguide (G) and points (P1, ... PN) of the ends of microguides (G1, ... GN) are optically joined by the grating for different wavelengths.

1 Claim, 4 Drawing Sheets

MULTIPLEXER-DEMULTIPLEXER USING AN ELLIPTICAL CONCAVE GRATING AND PRODUCED IN INTEGRATED OPTICS

DESCRIPTION

The present invention relates to an optical multiplexer-demultiplexer used in optical telecommunications.

It is known that wavelength multiplexing makes it possible to increase the information flow rate of an optical link. This technique consists of introducing at one of the ends of the link several (N) light beams of different wavelengths $\lambda 1, \lambda 2, \ldots, \lambda N$ in a same optical fibre (multiplexing operation) and then extracting at the other end of the link, the various wavelengths to restore the original beams (demultiplexing operation).

Although very interesting, this technique causes certain problems. Thus, the overall losses of the multiplexing and demultiplexing devices must be limited, the multiplexing or demultiplexing devices must be reversible, i.e. they are able to operate as a multiplexer in one direction and as a demultiplexer in the other and costs must be low.

The means according to the invention makes it possible to satisfy these three requirements through the use of integrated optics and a special type of diffraction grating.

An integrated optics guidance structure conventionally comprises a substrate covered by a stack of three transparent layers, the intermediate layer having a higher refraction index than the two layers surrounding it.

According to the invention, this guidance structure comprises: a plurality of optical microguides, whose number is equal to the number of operating wavelengths, said microguides having first ends which are level with the surface of one of the faces of the guidance structure with an adequate spacing to permit coupling to the same number of optical fibres, said microguides being drawn towards one another whilst penetrating the structure and having second drawn together ends distributed along a segment; a single optical microguide having a first end level with the surface of another face of the guidance structure and a second end disposed within the structure; a reflecting, concave diffraction grating constituted by facets etched in the stack of layers, the facets having as the cross-section ellipse portions, whereof the two foci coincide respectively in the one case with the second end of the single optical guide and in the other with the different second ends of the plurality of optical guides for each of the operating wavelengths of said guides.

The invention is described in greater detail hereinafter relative to the drawings, wherein show:

FIG. 1—A diagrammatic view of the multiplexer-demultiplexer of the invention.

Figure 2:
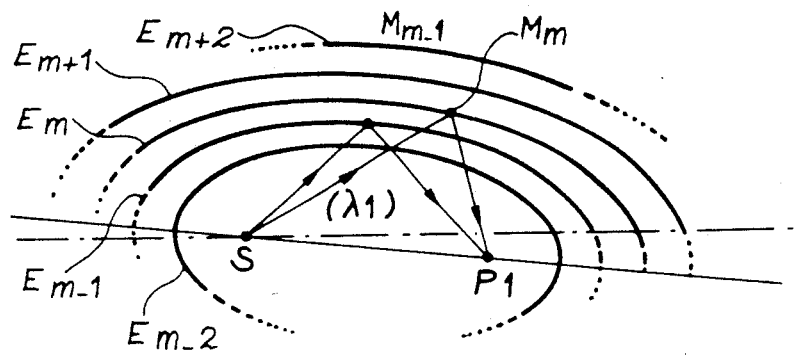

FIG. 2—A geometrical drawing showing the principle of focusing by a group of elliptical mirrors operating at a wavelength $\lambda 1$.

Figure 3:
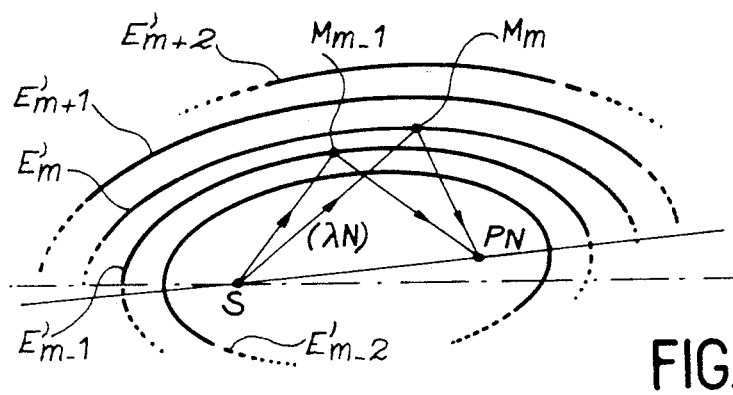

FIG. 3—A geometrical drawing identical to the preceding drawing, but for a wavelength $\lambda N$.

Figure 4:
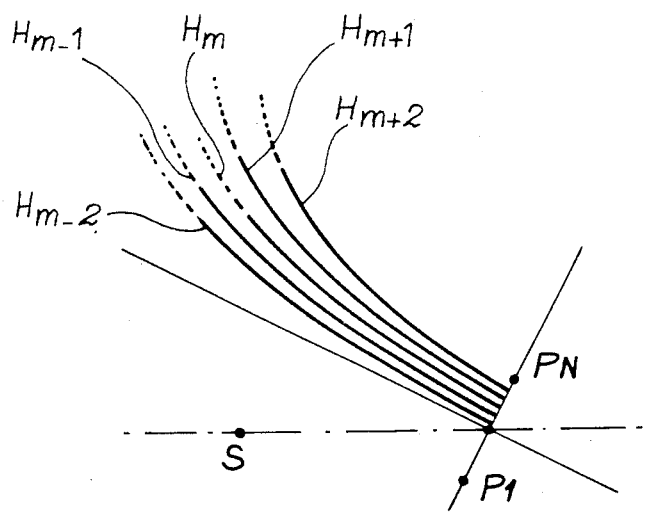

FIG. 4—A geometrical drawing showing a group of hyperbolas.

Figure 5:
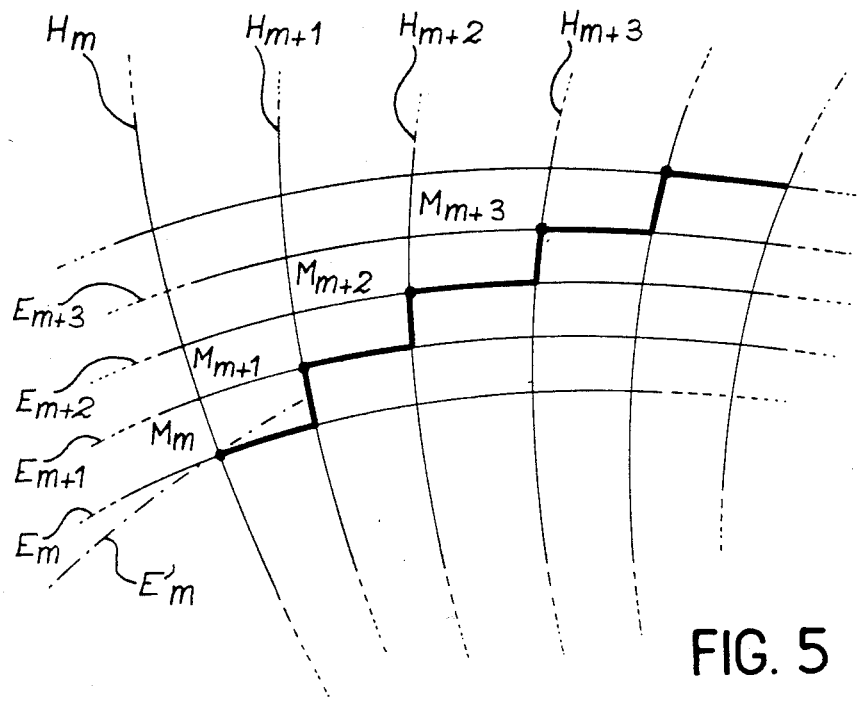

FIG. 5—A geometrical construction making it possible to define the different faces or facets of the grating.

Figure 6:
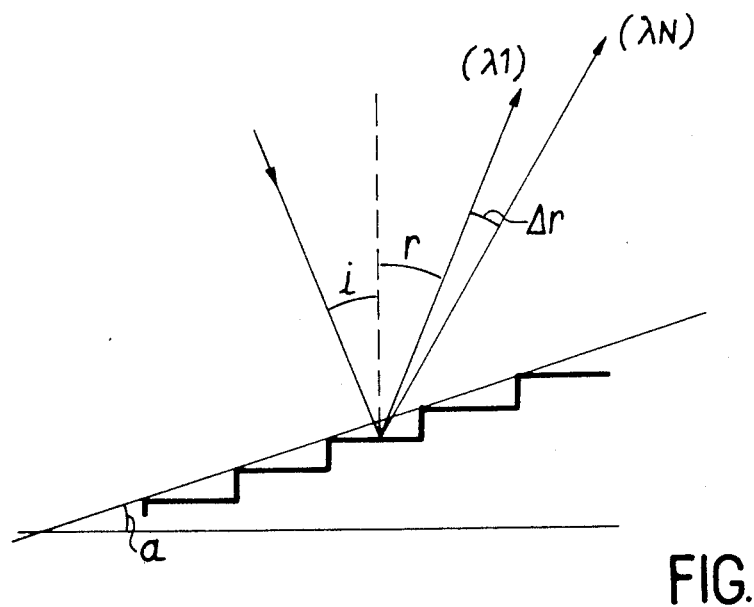

FIG. 6—In section a plane blazed grating.

Figure 7:
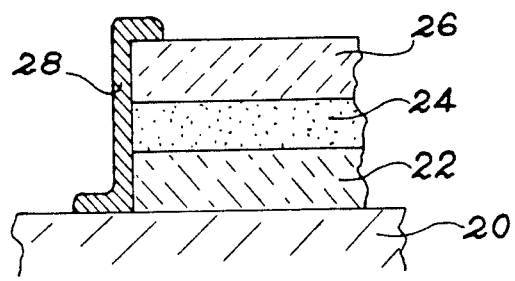

FIG. 7—In section, the optical guidance structure at one reflecting facet of the grating.

Figure 8:
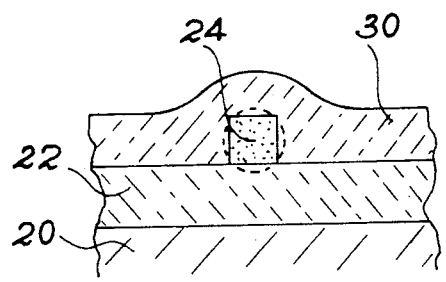

FIG. 8—In section, an optical microguide.

Figure 9:
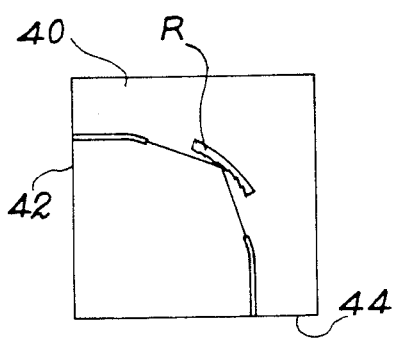

FIG. 9—A first arrangement of the different elements of the multiplexer-demultiplexer of the invention.

Figure 10:
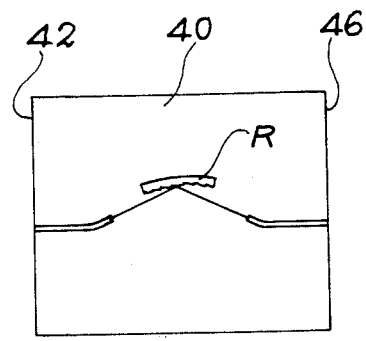

FIG. 10—A second arrangement of said same elements.

The structure shown in FIG. 1 has two faces F1 and F2. A plurality of N microguides G1, G2, .... GN (in the illustrated case N=4) level with the surface of face F1. On said face, the spacing of the microguides is e.g. approximately 125 $\mu$m so as to permit a coupling with the not shown optical fibres, which essentially have said diameter. On penetrating the guidance structure, said microguides are drawn together. Their ends are distributed over a segment between extreme points P1 and PN.

On the other face F2, there is a single microguide G, whereof one end is level with the surface of F2 and whereof the other end S is within the structure.

Between the plurality of N microguides G1, G2, ... . . GN and the single microguide G is provided a diffraction grating R constituted by reflecting facets or faces having an elliptical section, whereof the shape will be described in conjunction with FIGS. 2 to 5.

FIG. 2 shows a point S, assumed to be a source point, and a point P1 assumed to be an image point. Elliptical mirrors optically join these two points for a wavelength $\lambda 1$. Each ellipse Em is the location of points for which the following relation applies:

$$SMm + MmP1 = m\lambda 1 \qquad (1)$$

in which m is an integer, said relation representing the constancy of the optical path between points S and P1 (Fermat principle).

An ellipse corresponds to each value of m. FIG. 2 thus shows a group of ellipses Em−1, Em, Em+1, etc. parametrized by the integer m.

FIG. 3 shows another group of ellipses corresponding to the same point S, but at another joined point PN and for another wavelength $\lambda N$. Each ellipse E'm corresponds to the relation:

$$SMm + MmPN = m\lambda N \qquad (2)$$

in which m is again an integer. A point Mm can be both on ellipse Em of the first group and on ellipse E'm of the second group, if relations (1) and (2) are both satisfied for this point. If this is the case, condition $$MmP1 - MmPN = m(\lambda 1 - \lambda N) \qquad (3)$$

is obtained by member-by-member subtraction from these two relations. Relation (3) signifies that point Mm is on a hyperbola, whereof the foci are points P1 and PN.

FIG. 4 shows a group of hyperbolas Hm−1, Hm, Hm+1, etc. having as foci points P1 and PN. These hyperbolas are the locations of points satisfying relation (3).

FIG. 5 shows this group of hyperbolas (Hm) and one of the two ellipse groups, in this case group Em. The intersection of hyperbola Hm with ellipse Em gives a point Mm, which is obviously on ellipse Em, but which is also on ellipse E'm (shown in broken line form). Thus, points Mm+1, Mm+2, etc. located on hyperbolas Hm+1, Hm+2, etc. are located both on ellipses Mm+1 and M'm+1, Mm+2 and M'm+2, etc.

On plotting a line passing from point to point according to this principle, the profile of a diffraction grating is obtained, which will have the feature of optically joining points S and P1 for wavelength λ1 and points S and PN for wavelength λN.

Naturally, there is a certain amount of arbitrariness for passing from one ellipse to the other and in FIG. 5 this takes place perpendicular to the ellipses, but an inclined profile could also be used.

Grating R of FIG. 1 is conceived in this way. Points P1 and PN are the two end points of the segment on which issue the different microguides operating at wavelengths λ1 and λN. The intermediate points will be joined with S, but for intermediate wavelengths.

On returning to FIG. 1, it can be seen that the device shown, when operating as a multiplexer, receives a plurality of light beams on its face F1 and supplies a single multi-wavelength beam on its face F2 (arrow M). As a demultiplexer, it receives a multi-wavelength beam on its face F2 and supplies a plurality of beams of different wavelengths on its face F1 (arrow D).

The dispersion of the grating according to the invention can be calculated approximately by considering that in the vicinity of its axis, the grating can be likened to a plan grating as shown in FIG. 6. Angles i and r designate the angles of the beams striking and reflected by the facets, counted from the normal to the facets of the mirrors. Angle a designates the blaze angle of the grating.

It can be shown that the difference $\Delta r$ between the reflection angles of the beams corresponding to the wavelengths λ1 and λN is equal to $m(\lambda N - \lambda 1)/p \cdot \cos(i-\alpha)$. Thus, for example, one obtains an average spacing of 40 μm, an angle a of 4° and m=1.

The focal distance of the mirror will be approximately 10 mm. The spacing between points P1, P2, . . . . PN will be approximately 12 μm for a wavelength variation between the different channels of 20 nm. Angle i can be chosen relatively large (e.g. close to 65°). FIG. 7 shows, in section, a guidance structure with a substrate 20, e.g. of silicon, a first layer 22 of $SiO_2$ with a thickness of 6 to 8 μm, a second phosphorus-doped $SiO_2$ layer 24 with a thickness of approximately 4 to 5 μm and a third $SiO_2$ layer 26 of thickness 6 to 8 μm.

The index variation between layer 24 and adjacent layers 22, 26 is small, being approximately $10^{-3}$ to $10^{-2}$, as is the case for the optical fibres between the core and the sheath.

This stack can be etched to the substrate in order to constitute a reflecting face operating in total reflection. This etched face can also be covered by an e.g. aluminium metal layer 28.

In order to form the grating, on the guidance structure will be designed elliptical segments complying with the criterion of FIG. 5, e.g. by electronic masking and the structure will be etched along these segments.

In order to obtain microguides, it is possible to etch layer 24 of FIG. 7, in the manner illustrated in FIG. 8 and then cover the etched assembly by a $SiO_2$ layer 30. The light beam, whose section is hatched in the drawing is guided by conduit 24.

FIGS. 9 and 10 show two possible arrangements of the assembly described. In FIG. 9, plate 40 operates on faces 42 and 44, which are orthogonal and in FIG. 10 on faces 42 and 46, which are parallel.

The multiplexer-demultiplexer described hereinbefore operates with light beams with close wavelengths (approximately 20 nm). It can be combined with a multiplexer-demultiplexer like that described in French patent application No. 2 579 044 filed on Mar. 13 1983 in the name of the Applicant. Such a device comprises diffraction networks arranged in series, each diffracting a particular wavelength range. On leaving each of these gratings, it is possible to position a device according to the present invention, which will function on the beams whose wavelengths are in this range. This leads to multiplexing-demultiplexing in each range on close wavelengths.

We claim:

1. Multiplexer-demultiplexer in integrated optics, for operating at a plurality of different wavelengths, characterized in that it comprises a guidance structure formed by a substrate (20) covered by a stack of three transparent layers, a first layer (22), a second layer (24) and a third layer (26), the second layer (24) having a higher refraction index than that of the first (22) and third (26) layers surrounding it, said guidance structure comprising:

a plurality of optical microguides (G1, G2 . . . . . , GN), whose number (N) is equal to the number of operating wavelengths, said microguides having first ends which are level with the surface of one of the faces (F1) of the guidance structure with an adequate spacing to permit coupling to the same number of optical fibres, said microguides being drawn towards one another whilst penetrating the structure and having second drawn together ends (P1, P2 . . . . . , PN) distributed along a segment;

a single microguide (G) having a first end level with the surface of another face (P2) of the guidance structure and a second end (S) disposed within the structure;

a reflecting, concave diffraction grating (R) constituted by facets etched in the stack of layers, the facets having as the cross-section ellipse portions, whereof the two foci coincide respectively in the one case with the second end of the single optical guide (S) and in the other with the different second ends (P1, P2 . . . . . . PN) of the plurality of optical guides (G1, G2 . . . . . . , GN) for each of the operating wavelengths of said guides.

* * * * *